United States Patent
Dekel et al.

(10) Patent No.: US 12,259,969 B2
(45) Date of Patent: Mar. 25, 2025

(54) DETECTING ANOMALIES IN DISTRIBUTED APPLICATIONS BASED ON PROCESS DATA

(71) Applicant: VMware LLC, Palo Alto, CA (US)

(72) Inventors: Edo Yacov Dekel, Tel-Aviv (IL); Haim Helman, San Jose, CA (US); Yuval Rado, Ramat Gan (IL)

(73) Assignee: VMWare LLC, Palo Alto, CA (US)

( * ) Notice: Subject to any disclaimer, the term of this patent is extended or adjusted under 35 U.S.C. 154(b) by 270 days.

(21) Appl. No.: 17/948,134

(22) Filed: Sep. 19, 2022

(65) Prior Publication Data

US 2024/0095347 A1    Mar. 21, 2024

(51) Int. Cl.
*G06F 21/55*    (2013.01)
(52) U.S. Cl.
CPC ...... *G06F 21/552* (2013.01); *G06F 2221/034* (2013.01)
(58) Field of Classification Search
CPC .................. G06F 21/552; G06F 2221/034
See application file for complete search history.

(56) References Cited

U.S. PATENT DOCUMENTS

| | | | |
|---|---|---|---|
| 11,343,310 B2 | 5/2022 | Dekel et al. | |
| 2017/0093918 A1* | 3/2017 | Banerjee | H04L 41/0895 |
| 2019/0163559 A1* | 5/2019 | Takahashi | G06F 11/0793 |
| 2020/0252416 A1* | 8/2020 | Niv | H04L 41/40 |
| 2023/0145484 A1* | 5/2023 | Jain | G06F 11/3065 718/1 |
| 2023/0169168 A1* | 6/2023 | Magen Medina | G06F 9/45558 726/23 |
| 2023/0185628 A1* | 6/2023 | Lo | G06F 9/3891 718/1 |
| 2024/0028725 A1* | 1/2024 | Segal | G06F 21/53 |

* cited by examiner

*Primary Examiner* — Kambiz Zand
*Assistant Examiner* — Calvin Thanh Nguyen
(74) *Attorney, Agent, or Firm* — Quarles & Brady LLP

(57) ABSTRACT

Techniques for detecting anomalies in a distributed application based on process data are provided. This process data can include, e.g., the hierarchy (i.e., tree) of processes created and run by the application, the file system operations performed by each process, the network access operations performed by each process.

21 Claims, 4 Drawing Sheets

DETECTING ANOMALIES IN DISTRIBUTED APPLICATIONS BASED ON PROCESS DATA

CROSS-REFERENCES TO RELATED APPLICATIONS

The present application is related to commonly-owned U.S. Pat. No. 11,343,310 issued May 24, 2022 and entitled "Detecting Anomalies in a Distributed Application."

BACKGROUND

Unless specifically indicated herein, the approaches described in this section should not be construed as prior art to the claims of the present application and are not admitted to be prior art by inclusion in this section.

A distributed application is a software program composed of multiple executable parts, each running on a different machine and communicating with each other over a network. In contrast, a monolithic application is a software program that is self-contained and consists of a single executable. One example of a distributed application is an application deployed using Kubernetes, which is an open-source software platform for orchestrating the deployment, scheduling, and scaling of containerized applications. Generally speaking, a Kubernetes application is composed of parts referred to as workloads, which in turn are composed of sub-parts referred to as pods that are distributed across the nodes (i.e., machines) of a Kubernetes cluster. Each pod includes one or more containers that run the software processes needed to implement the Kubernetes application.

Various techniques have been developed to detect anomalies in monolithic applications as a way to alert the applications' users that malware might be present. However, these techniques are not readily transportable to distributed applications for several reasons. For example, because a distributed application comprises several parts/sub-parts that may behave differently from each other, there is a need to understand the normal (i.e., non-anomalous) behavior of each such part/sub-part in order to identify anomalies. This is not possible using anomaly detection techniques for monolithic applications, which are generally limited to modeling and evaluating holistic application behavior.

Further, some Kubernetes applications may organize their pods into logical groupings known as replica sets, where all of the pods in a replica set are replicas of each other and thus are expected to behave identically (or at least similarly) on average. For these applications, one of the pods in a replica set may exhibit behavior that appears normal when compared to its historical behavior but is different from the current behavior of other pods in the same replica set. There is a need to flag this type of scenario as anomalous, which again is not possible using existing techniques for monolithic applications.

DETAILED DESCRIPTION

In the following description, for purposes of explanation, numerous examples and details are set forth in order to provide an understanding of various embodiments. It will be evident, however, to one skilled in the art that certain embodiments can be practiced without some of these details or can be practiced with modifications or equivalents thereof 1. Overview Embodiments of the present disclosure are directed to techniques for detecting anomalies in a distributed application based on process data (i.e., information regarding the software processes executed by the distributed application). This process data can include the hierarchy (i.e., tree) of processes created and run, statistics of the processes' use of resources such as memory and compute, the file system operations performed by each process, the network access operations performed by each process, and more. In one set of embodiments, the techniques described herein can detect anomalous behavior in a particular part (e.g., workload) or sub-part (e.g., pod) of the distributed application by comparing current process data collected for that part/sub-part with a reference model that captures the part/sub-part's historical (i.e., normal) process behavior. In a further set of embodiments, these techniques can detect anomalous behavior in a sub-part based on a comparison of that sub-part's current process data with the current process data of other sub-parts in the same replica set.

2. Example Environment and Solution Architecture

Figure 1:
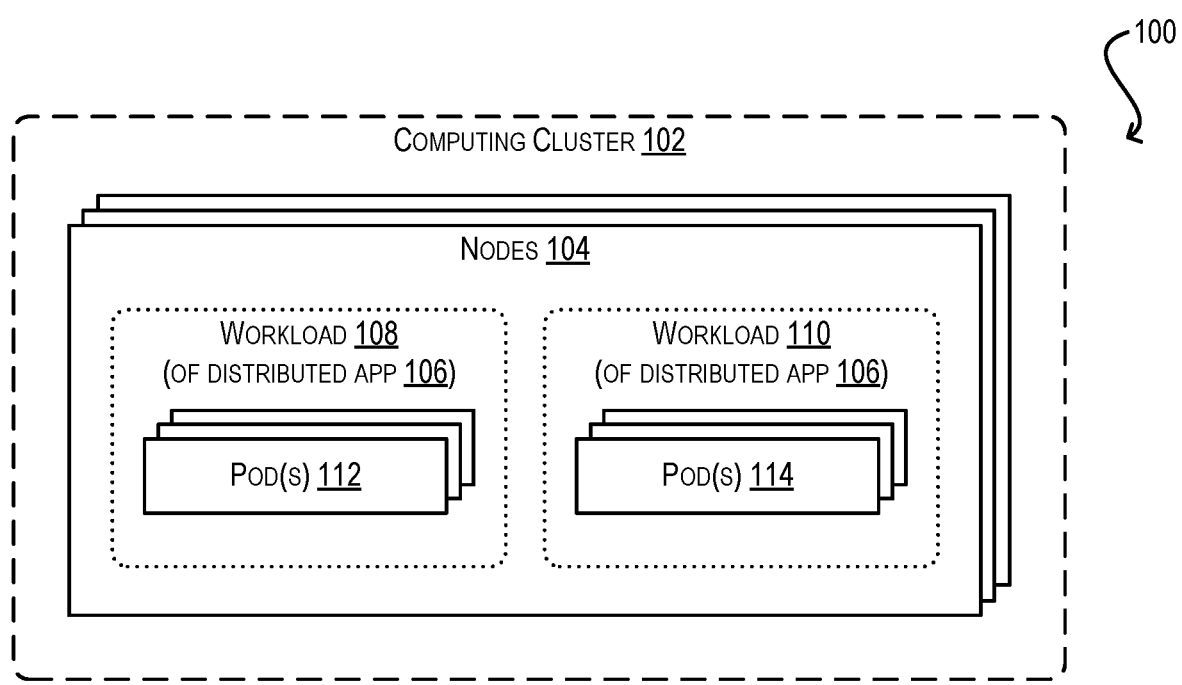
FIG. 1 depicts an example environment comprising a computing cluster running a distributed application according to certain embodiments.

FIG. 1 is a simplified block diagram of an example environment 100 in which embodiments of the present disclosure may be implemented. Environment 100 includes a computing cluster 102 comprising a plurality of nodes 104, which may be physical or virtual machines. Each node 104 is configured to run one or more parts (e.g., workloads) or sub-parts (e.g., pods) of a distributed application 106. In the embodiments described herein, computing cluster 102 is assumed to be a Kubernetes cluster and distributed application 106 is assumed to be a Kubernetes application. However, in alternative embodiments computing cluster 102 may be any type of cluster and distributed application 106 may be any type of distributed application known in the art.

As shown, distributed application 106 is composed of two workloads: a first workload 108 and a second workload 110. These workloads can be understood as separate parts of distributed application 106 that are designed to carry out functionally distinct tasks. For example, if distributed application 106 is an e-commerce application, workload 108 may implement a storefront service for presenting the application's user interface and workload 110 may implement a checkout service for handling the checkout process. Although only two workloads are depicted for purposes of illustration, distributed application 116 may include any number of workloads.

Each workload 108/110 includes a set of pods (112 and 114 respectively), and each pod includes one or more containers (not shown). These containers are executable software packages that run the various software processes of distributed application 106. The terms "pod" and "container" are used interchangeably in the present disclosure because in many cases a pod will include exactly one container.

In some embodiments, the pods in one or both of workloads 108 and 110 may form a replica set. The idea behind a replica set is to replicate the processing of a workload across multiple identical pods running on different cluster nodes for load balancing and fault tolerance. Accordingly, in the case where, e.g., pods 112 of workload 108 form a replica set, all of these pods will be replicas of each other (which means they should exhibit the same or similar behavior on average) and will be deployed on separate nodes of computing cluster 102.

As mentioned in the Background section, existing techniques for detecting anomalous behavior in monolithic applications are generally inadequate for detecting anomalous behavior in distributed applications like application 106 of FIG. 1 for various reasons. These reasons largely stem from the inability of these existing techniques to analyze the behavior of individual parts (e.g., workloads) and sub-parts (e.g., pods) of a distributed application, both against historical normal behavior and against the behavior of other identical parts/sub-parts, such as other pods in the same replica set.

Figure 2:
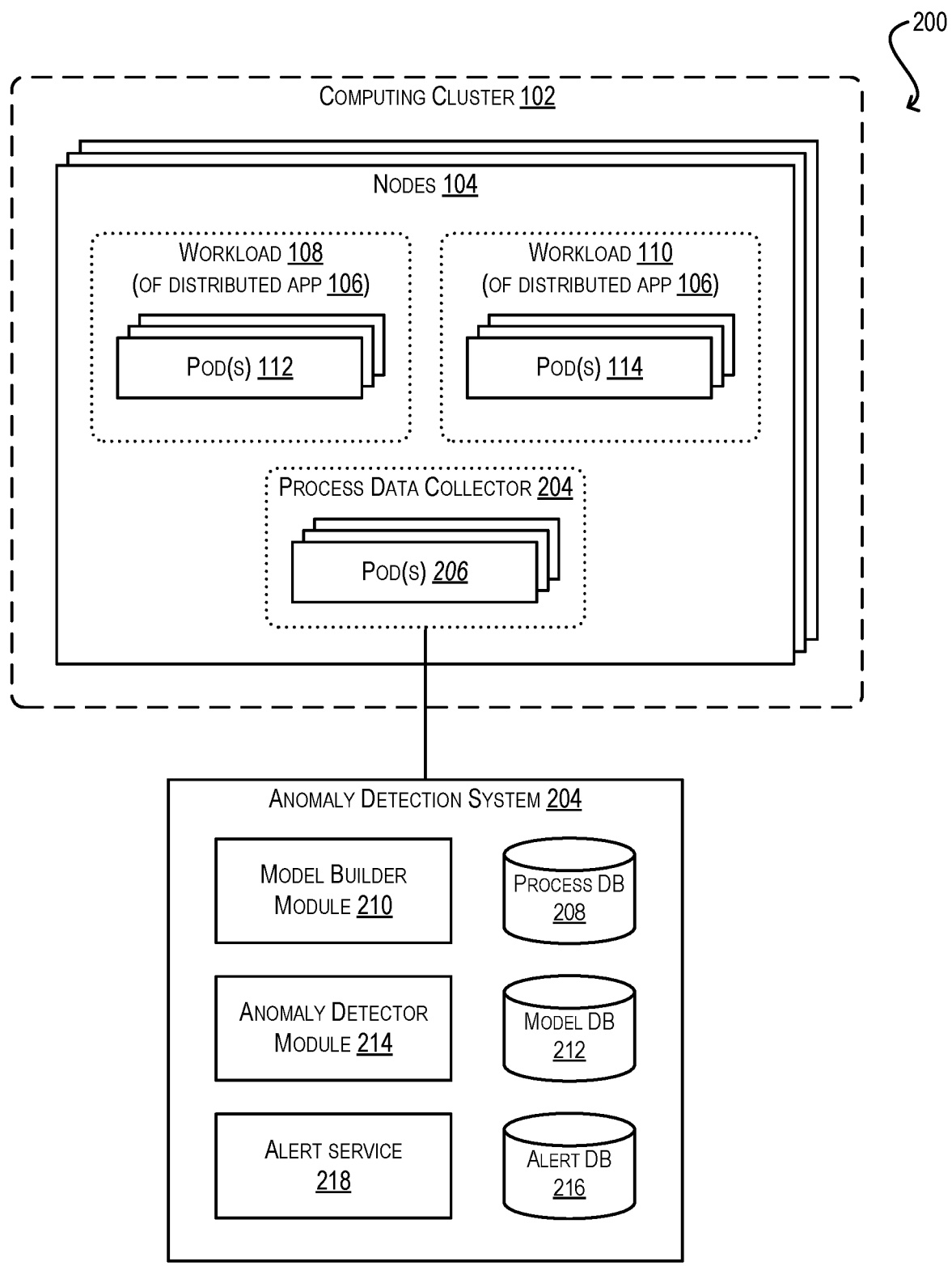
FIG. 2 depicts an enhanced version of the environment of FIG. 1 that implements an anomaly detection system for the distributed application according to certain embodiments.

To address these issues, FIG. 2 depicts an enhanced version of environment 100 (i.e., environment 200) that includes a novel process data collector 202 running on nodes 104 of computing cluster 102 and a novel anomaly detection system 204 coupled with cluster 102. Anomaly detection system 204 may be deployed on one or more computer systems in any public or private cloud, and in some cases may be deployed in the same data center where computing cluster 102 is deployed. Further, in some embodiments anomaly detection system 204 may be operated by a third-party distinct from the operator of computing cluster 102 and may be connected to a plurality of computing clusters of different organizations/customers to whom the third-party provides anomaly detection services.

At a high level, one or more pods 206 of process data collector 202 can monitor the software processes running within pods 112 and 114 of workloads 108 and 110 respectively and can collect data regarding these processes. For example, the collected data may include identifiers (i.e., process IDs), names, and other metadata of the processes created and running in each pod, including relationships between parent processes and child processes spawned/forked by the parent processes. The collected data may also include information regarding operations performed by each process, such as file system operations, network access operations, and so on. One or more other pods 206 of process data collector 202 can transmit this information to anomaly detection system 204, where it can be stored in a structured manner in a process database (DB) 208. These steps of collecting process data regarding distributed application 106 and storing the collected data in process DB 208 can be performed on a continuous basis throughout the runtime of application 106.

Concurrently with the above, anomaly detection system 204 can carry out a two-stage process for enabling anomaly detection with respect to distributed application 106. During the first stage (referred to as model building) a model builder module 210 of anomaly detection system 204 can retrieve process data stored in process DB 208 that pertains to a reference time period over which distributed application 106 is known or expected to have exhibited normal behavior. This reference time period may be specified by an administrator of computing cluster 102 or anomaly detection system 204 or determined via an automated mechanism.

Model builder module 210 can then use the retrieved process data to build, for each workload of distributed application 106, a reference model that captures (or in other words, models) the normal process behavior of that workload, and each pod of the workload, over the reference time period. For example, in the example of FIGS. 1 and 2, model builder module 210 may build a first reference model for workload 108 and a second reference model for workload 110. In one set of embodiments, each reference model may take the form of a machine learning (ML) anomaly detection model, such as a neural network classifier. In these embodiments, model builder module 210 may build each reference model by training the reference model on the retrieved process data using an ML training technique, such as backpropagation in the case of a neural network classifier. In another set of embodiments, each reference model make take the form of a rules-based anomaly detection model that includes one or more static rules defining normal or anomalous process behavior. In these embodiments, model builder module 210 may build each reference model by creating the rules in accordance with the behavior observed in the retrieved process data. For example, model builder module 210 may compile statistics regarding the processes and process operations seen during the reference time period and create rules indicating that any process behavior outside of that observed behavior should be deemed anomalous. In some cases, such statistics may also be used to build the ML-based model mentioned above. Module builder module 210 can thereafter store the created reference models in a model DB 212.

Once appropriate reference models have been created for distributed application 116, during the second stage (referred to as inference), an anomaly detector module 214 of anomaly detection system 204 can retrieve process data stored in process DB 208 that pertains to an inference time period over which distributed application 106 may or may not be exhibiting anomalous behavior. This inference time period may correspond to the current operation of distributed application 106, such as the most recent X minutes or hours, or some prior time period for which anomaly detection is desired.

Anomaly detector module 214 can then analyze the retrieved process data to identify any anomalies during the inference time period. In one set of embodiments, this analysis can include applying the retrieved process data for each pod and workload of distributed application 106 to its corresponding reference model (as stored in model DB 212), resulting in a prediction of whether the pod or workload is anomalous or not based on its historical normal behavior. In this way, anomaly detection system 204 can evaluate and detect anomalous behavior with respect to individual parts and sub-parts of distributed application 106, rather than solely with respect to the application as a whole. If the reference model generates a prediction of "anomalous" for any pod or workload, anomaly detector module 214 can store a structured record of this outcome, including the details of the affected pod/workload and the process data indicating anomalous behavior, in an alert DB 216. An alert service 218 can subsequently issue alerts regarding the anomaly records stored in alert DB 216 to, e.g., an administrator of computing cluster 102 or anomaly detection system 204 according to preferences set by the administrator.

In a further set of embodiments, the analysis performed by anomaly detector module 214 can include comparing the retrieved process data for each pod in each replica set of distributed application 106 to the retrieved process data for other pods in the same replica set. In this way, anomaly detection system 204 can evaluate and detect anomalies in a particular pod based on how similar its process behavior is to its replica set peers over the same time period, even if the pod's process behavior appears normal from a historical (i.e., reference model) perspective. If any pod in a replica set exhibits process behavior that deviates from the process behavior of other pods in the same replica set beyond some predetermined threshold, anomaly detector module 214 can flag that pod as being anomalous and generate a record in alert DB 216 as mentioned above. This threshold can differ depending on the particular process behavior and can be configured according to a policy set by the administrator of computing cluster 102 or anomaly detection system 204.

The remaining sections of this disclosure provide additional details regarding the model building performed by model builder module 210 and the inference performed by anomaly detector module 214 according to various embodiments. It should be appreciated that FIG. 2 is illustrative and not intended to limit embodiments of the present disclosure. For example, although FIG. 2 depicts a particular arrangement of modules in anomaly detection system 204, other arrangements are possible (e.g., the functionality attributed to a particular module may be split into multiple modules, modules may be combined, etc.). One of ordinary skill in the art will recognize other variations, modifications, and alternatives.

3. Model Building

Figure 3:
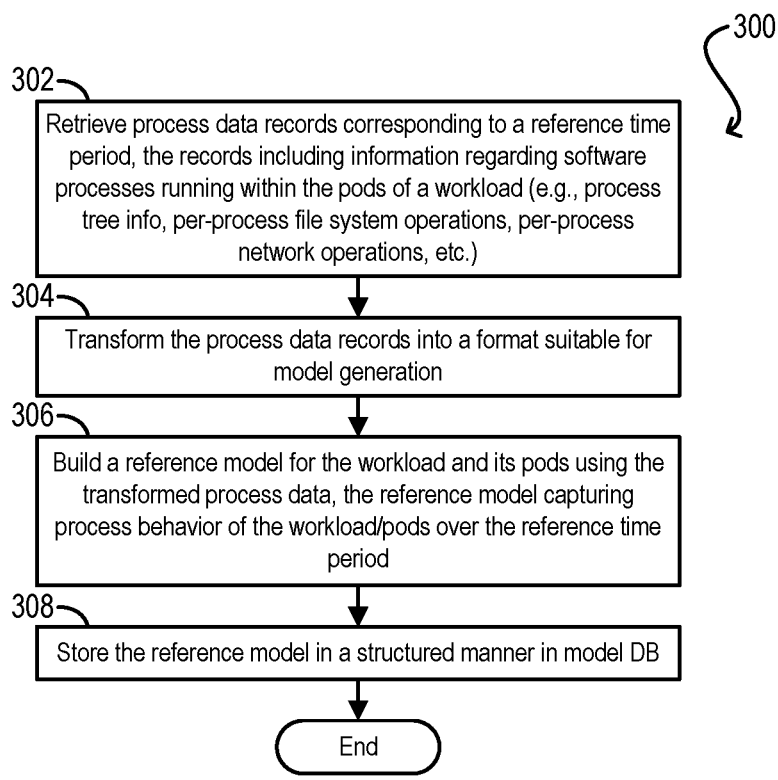
FIG. 3 depicts a model building flowchart according to certain embodiments.

FIG. 3 depicts a flowchart 300 that may be executed by model builder module 210 of anomaly detection system 204 for building a reference model for a workload of distributed application 106 according to certain embodiments. Flowchart 300 may be repeated for each workload of the application.

Starting with step 302, model builder module 210 can retrieve, from process DB 208, process data records received from process data collector 202 over a reference time period, where the process data records include information regarding software processes running within the pods of the workload. In one set of embodiments, these process data records can be classified into four types: process tree records, process resource usage records, process file system operation records, and process network operation records. With respect to the first type, each process tree record can include metadata regarding a process created/initiated within a workload pod, such as an ID of the pod, an ID of the process, a name of the process, a time of creation, an ID of its parent process (if spawned/forked from another process), etc. With respect to the second type, each process resource usage record can include metadata regarding the resources consumed by a running process, such as memory, compute (e.g., CPU cycles), etc. With respect to the third type, each process file system operation record can identify a file system operation performed by a process and metadata regarding that operation. Examples of such file system operations include opening a file, reading a file, writing a file, changing attributes of a file (e.g., access mode, etc.), and so on. And with respect to the fourth type, each process network operation record can identify a network operation performed by a process and metadata regarding that operation. Examples of such network operations include opening a network socket, transmitting data, receiving data, and so on. For network traffic that is received by the process, the metadata can comprise information regarding the origin of the traffic, such as a source address, source port, source process/pod/workload (if received from another pod or workload), and so on. For network traffic that is transmitted by the process, the metadata can comprise information regarding the destination of the traffic, such as a destination address, destination port, destination process, destination process/pod/workload (if sent to another pod or workload), and so on.

At step 304, model builder module 210 can transform the process data records retrieved at step 302 into a format suitable for model generation. The specific manner in which this pre-processing step is implemented will differ depending on the type of each process data record. For example, for process tree records, model builder module 210 may build a process tree or graph for each pod of the workload and/or for the workload as a whole that captures all of the processes running with the pod/workload and the parent-child relationships between the processes. For process resource usage records, model builder module 210 may compile statistics regarding the resources consumed by each process. For process file system operation records, model builder module 210 may compile statistics regarding the file system operations performed by each process, such as the number of file writes to a given file or type of file, the number of file reads of a given file or type of file, etc. And for process network operation records, module builder module 210 may compile statistics regarding the network operations performed by each process, such as the number of network sockets opened, the amount of traffic sent to a particular destination address or domain, the amount of traffic received from a particular source address or domain, etc.

At step 306, model builder module 210 can use the transformed process data to build a reference model that captures the behavior of the workload and its pods over the reference time period. In the case where the reference model is an ML anomaly detection model, this step can comprise training the reference model on the transformed process data using an appropriate ML training technique. In the case where the reference model is a rules-based model, this step can comprises creating a set of rules that define the boundaries of normal process behavior for the workload and its pods in accordance with the transformed process data (e.g., a normal process tree, a normal number of file reads by process P1 to files of type A, a normal amount of outbound network traffic from process P2 to domain D, etc.).

Finally, at step 308, model builder module 210 can store the reference model in a structured manner in model DB 212 and the flowchart can end. It should be noted that over time, the configuration of distributed application 106 may change in a manner that modifies the composition of pods in a given workload, thereby invalidating a previously generated reference model for the workload. In these cases, the workload's reference model can be rebuilt by repeating flowchart 300 using process data collected over a reference time period occurring after the change.

4. Anomaly Detection

Figure 4:
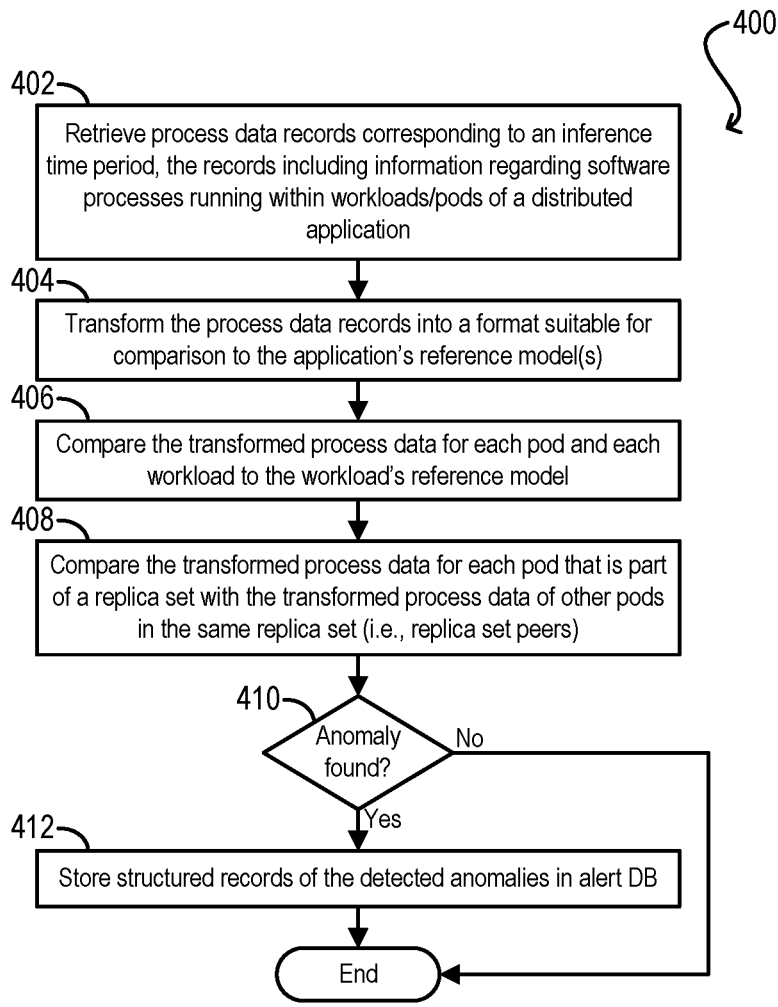
FIG. 4 depicts an anomaly detection flowchart according to certain embodiments.

FIG. 4 depicts a flowchart 400 that may be executed by anomaly detector module 214 of anomaly detection system 204 for detecting anomalies in distributed application 106 according to certain embodiments. Flowchart 400 assumes that reference models have been built for the workloads of distributed application 106 via flowchart 300 of FIG. 3.

Starting with step 402, anomaly detector module 214 can retrieve, from process DB 208, process data records received from process data collector 202 over an inference time period, where the process data records include information regarding software processes running within distributed application 116's workloads/pods. As mentioned previously, this inference time period may be the most recent X minutes/hours/etc., or a historical time period specified by an administrator.

At step 404, anomaly detector module 214 can transform the process data records retrieved at step 402 into a format suitable for comparison (or being provided as input) to the reference models created for distributed application 116. For example, if the retrieved process data records include records regarding specific processes running with a pod Y of workload 108, anomaly detector module 214 can transform those records into a process tree for pod Y. As another example, if the retrieved process data records include records regarding file system or network operations performed by specific processes running with pod Y, anomaly detector module 214 can transform those records into file system operation statistics or network operation statistics for pod Y.

At step 406, anomaly detector module 214 can compare the transformed process data for each pod and each workload to the workload's reference model. Any process behavior observed in the pod or workload via the transformed process data that deviates from the reference model can be flagged as an anomaly. For example, the following is a non-exhaustive list of such discrepancies:
- A difference in process trees for a given pod/workload
- A difference, beyond a configurable threshold, in the usage of one or more types of resources for certain processes of a given pod/workload
- A difference, beyond a configurable threshold, in one or more file system operation statistics for certain processes of a given pod/workload
- A difference, beyond a configurable threshold, in one or more network operation statistics for certain processes of a given pod/workload
- A difference in destinations to which network traffic is sent by certain processes of a given pod/workload (e.g., a new destination address, a new destination process/pod/workload, etc. not seen in the reference model)
- A difference in sources from which network traffic is received by certain processes of a given pod/workload (e.g., a new source address, a new source process/pod/workload, etc. not seen in the reference model)

In addition, at step 408, anomaly detector module 214 can compare the transformed process data for each pod that is part of a replica set with the transformed process data of other pods in the same replica set. Any process behavior observed in the pod that deviates from the process behavior of its replica set peers can be flagged as an anomaly. As with step 406, these discrepancies can include differences in process trees, differences in per-process resource usage statistics, differences in per-process file system operation statistics, and/or differences in per-process network operation statistics and network traffic sources/destinations.

At step 410, anomaly detector module 214 can determine whether an anomaly was detected via the comparisons made at either step 406 or 408. If the answer is yes, anomaly detector module 214 can store structured records of the detected anomalies in alert DB 216 (step 412), which will cause alert service 218 to issue alerts regarding those anomalies to, e.g., an administrator or computing cluster 102 or anomaly detection system 204 per administrator-defined policy. Finally, flowchart 400 can end after step 412 or if the answer at decision step 410 is no (i.e., no anomalies detected).

Certain embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a generic computer system comprising one or more general purpose processors (e.g., Intel or AMD x86 processors) selectively activated or configured by program code stored in the computer system. In particular, various generic computer systems may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any storage device, based on any existing or subsequently developed technology, that can store data and/or computer programs in a non-transitory state for access by a computer system. Examples of non-transitory computer readable media include a hard drive, network attached storage (NAS), read-only memory, random-access memory, flash-based nonvolatile memory (e.g., a flash memory card or a solid state disk), persistent memory, NVMe device, a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations can be implemented as a combined structure or component. Similarly, structures and functionality presented as a single component can be implemented as separate components.

As used in the description herein and throughout the claims that follow, "a," "an," and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. These examples and embodiments should not be deemed to be the only embodiments and are presented to illustrate the flexibility and advantages of particular embodiments as defined by the following claims. Other arrangements, embodiments, implementations, and equivalents can be employed without departing from the scope hereof as defined by the claims.

What is claimed is:

1. A method comprising:
receiving, by a computer system, a first plurality of process data records from a computing cluster running a distributed application, the distributed application being composed of a workload comprising one or more pods, the first plurality of process data records including first information regarding software processes running within the one or more pods over a first time period;
building, by the computer system, a reference model based on the first plurality of process data records, the reference model capturing normal process behavior of the workloads and the one or more pods;
receiving, by the computer system, a second plurality of process data records from the computing cluster, the second plurality of process data records including second information regarding software processes running within the one or more pods over a second time period;
comparing, by the computer system, the second plurality of process data records to the reference model;
upon detecting a deviation between the second plurality of process data records and the reference model, generating, by the computer system, a record indicating an anomaly in the workload or the one or more pods during the second time period; and
adjusting the resource allocation or restarting the one or more pods exhibiting the anomaly to restore normal operation of the distributed application.

2. The method of claim 1 wherein the first and second pluralities of process data records include one or more process tree records, each process tree record including an identifier of a software process running within a pod and an identifier of a parent process of the software process, if the software process was spawned or forked from the parent process.

3. The method of claim 1 wherein the first and second pluralities of process data records include one or more file system operation records, each file system operation record identifying a file system operation performed by a software process running within a pod and including metadata regarding the file system operation.

4. The method of claim 1 wherein the first and second pluralities of process data records include one or more network operation records, each network operation record identifying a network operation performed by a software process running within a pod and including metadata regarding the network operation.

5. The method of claim 1 wherein the building comprises:
transforming the first plurality of process data records into a format for building the reference model; and
building the reference model using the transformed first plurality of process data records.

6. The method of claim 1 wherein the comparing comprises:
transforming the second plurality of process data records into a format for comparison to the reference model; and
comparing the transformed second plurality of process data records to the reference model.

7. The method of claim 1 further comprising, for each pod of the distributed application that is part of a replica set:
comparing a first subset of the second plurality of process data records corresponding to the pod to second subsets of the second plurality of process data records corresponding to other pods in the replica set; and
upon detecting a deviation between the first subset and the second subsets, generating another record indicating an anomaly in the pod during the second time period.

8. A non-transitory computer readable storage medium having stored thereon program code executable by a computer system, the method comprising:
receiving a first plurality of process data records from a computing cluster running a distributed application, the distributed application being composed of a workload comprising one or more pods, the first plurality of process data records including first information regarding software processes running within the one or more pods over a first time period;
building a reference model based on the first plurality of process data records, the reference model capturing normal process behavior of the workloads and the one or more pods;
receiving a second plurality of process data records from the computing cluster, the second plurality of process data records including second information regarding software processes running within the one or more pods over a second time period;
comparing the second plurality of process data records to the reference model;
upon detecting a deviation between the second plurality of process data records and the reference model, generating a record indicating an anomaly in the workload or the one or more pods during the second time period; and
adjusting the resource allocation or restarting the one or more pods exhibiting the anomaly to restore normal operation of the distributed application.

9. The non-transitory computer readable storage medium of claim 8 wherein the first and second pluralities of process data records include one or more process tree records, each process tree record including an identifier of a software process running within a pod and an identifier of a parent process of the software process, if the software process was spawned or forked from the parent process.

10. The non-transitory computer readable storage medium of claim 8 wherein the first and second pluralities of process data records include one or more file system operation records, each file system operation record identifying a file system operation performed by a software process running within a pod and including metadata regarding the file system operation.

11. The non-transitory computer readable storage medium of claim 8 wherein the first and second pluralities of process data records include one or more network operation records, each network operation record identifying a network operation performed by a software process running within a pod and including metadata regarding the network operation.

12. The non-transitory computer readable storage medium of claim 8 wherein the building comprises:
transforming the first plurality of process data records into a format suitable for building the reference model; and
building the reference model using the transformed first plurality of process data records.

13. The non-transitory computer readable storage medium of claim 8 wherein the comparing comprises:
transforming the second plurality of process data records into a format for comparison to the reference model; and
comparing the transformed second plurality of process data records to the reference model.

14. The non-transitory computer readable storage medium of claim 8 wherein the method further comprises, for each pod of the distributed application that is part of a replica set:

comparing a first subset of the second plurality of process data records corresponding to the pod to second subsets of the second plurality of process data records corresponding to other pods in the replica set; and upon detecting a deviation between the first subset and the second subsets, generating another record indicating an anomaly in the pod during the second time period.

15. A computer system comprising:

a processor; and a non-transitory computer readable medium having stored thereon program code that, when executed, causes the processor to:

receive a first plurality of process data records from a computing cluster running a distributed application, the distributed application being composed of a workload comprising one or more pods, the first plurality of process data records including first information regarding software processes running within the one or more pods over a first time period;

build a reference model based on the first plurality of process data records, the reference model capturing normal process behavior of the workloads and the one or more pods;

receive a second plurality of process data records from the computing cluster, the second plurality of process data records including second information regarding software processes running within the one or more pods over a second time period;

compare the second plurality of process data records to the reference model;

upon detecting a deviation between the second plurality of process data records and the reference model, generate a record indicating an anomaly in the workload or the one or more pods during the second time period; and adjust the resource allocation or restarting the one or more pods exhibiting the anomaly to restore normal operation of the distributed application.

16. The computer system of claim 15 wherein the first and second pluralities of process data records include one or more process tree records, each process tree record including an identifier of a software process running within a pod and an identifier of a parent process of the software process, if the software process was spawned or forked from the parent process.

17. The computer system of claim 15 wherein the first and second pluralities of process data records include one or more file system operation records, each file system operation record identifying a file system operation performed by a software process running within a pod and including metadata regarding the file system operation.

18. The computer system of claim 15 wherein the first and second pluralities of process data records include one or more network operation records, each network operation record identifying a network operation performed by a software process running within a pod and including metadata regarding the network operation.

19. The computer system of claim 15 wherein the building comprises:

transforming the first plurality of process data records into a format for building the reference model; and building the reference model using the transformed first plurality of process data records.

20. The computer system of claim 15 wherein the comparing comprises:

transforming the second plurality of process data records into a format for comparison to the reference model; and comparing the transformed second plurality of process data records to the reference model.

21. The computer system of claim 15 wherein the program code further causes the processor to, for each pod of the distributed application that is part of a replica set:

compare a first subset of the second plurality of process data records corresponding to the pod to second subsets of the second plurality of process data records corresponding to other pods in the replica set; and upon detecting a deviation between the first subset and the second subsets, generate another record indicating an anomaly in the pod during the second time period.

* * * * *